United States Patent [19]
Ammann

[11] 3,934,788
[45] Jan. 27, 1976

[54] METHOD FOR WELDING A TOP PART AND AN ASSOCIATED BOTTOM PART

[75] Inventor: Herbert Ammann, Winterthur, Switzerland

[73] Assignee: Sulzer Brothers Limited, Winterthur, Switzerland

[22] Filed: Jan. 17, 1974

[21] Appl. No.: 434,066

[30] Foreign Application Priority Data
Jan. 18, 1973   Switzerland............................ 674/73

[52] U.S. Cl. ................. 228/212; 228/4.1; 228/44.1
[51] Int. Cl.[2].......................................... B23K 37/04
[58] Field of Search .......... 269/37, 43; 29/493, 464; 219/158; 228/4, 6, 44, 212, 4.1, 44.1

[56] References Cited
UNITED STATES PATENTS

| | | |
|---|---|---|
| 1,952,217 | 3/1934 | Patton et al. ........................ 29/493 |
| 2,280,150 | 4/1942 | Hasse et al. ........................... 29/493 |
| 3,076,261 | 2/1963 | Christensen ......................... 29/493 |
| 3,182,988 | 5/1965 | Woodall ................................ 269/37 |
| 3,210,068 | 10/1965 | Shelton ................................ 29/493 |

Primary Examiner—Francis S. Husar
Assistant Examiner—Carl Rowold
Attorney, Agent, or Firm—Kenyon & Kenyon Reilly Carr & Chapin

[57] ABSTRACT

In order to weld a cup-shaped member to a ring, claws are secured to the exterior surfaces of each part. In addition, a resilient member such as a ductile aluminum plate is placed between each pair of claws. The parts are spaced apart to form a gap in which a welding seam can be made. During cooling, the welding seam shrinks. This causes the aluminum plates between the claws to plastically deform. Thereafter, the claws and plates can be removed and the finished welding carried out.

4 Claims, 1 Drawing Figure

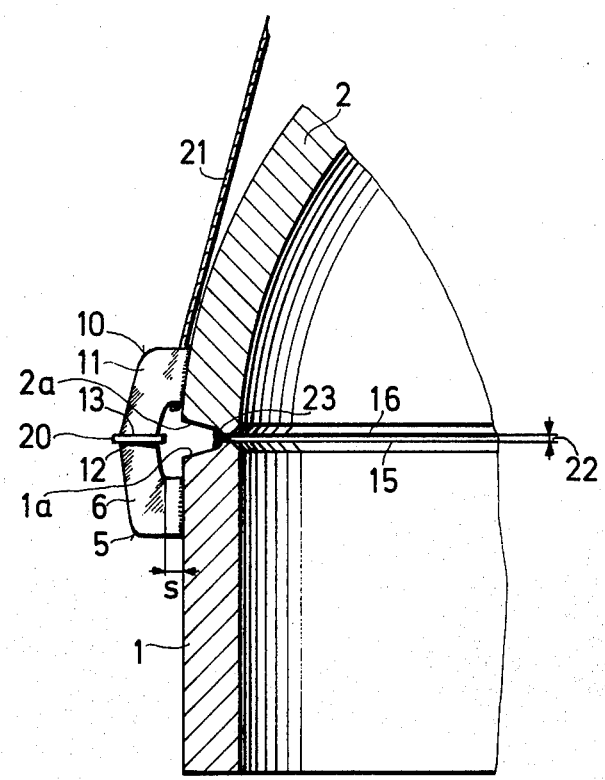

METHOD FOR WELDING A TOP PART AND AN ASSOCIATED BOTTOM PART

The invention relates to a method for welding a top part and an associated bottom part, spacers being employed to form a gap between both parts for filling with weld material whereupon the gap is filled with weld material.

In a known method the gap is located by tack welding after which the spacers are removed and the gap is filled with weld material by weld seams which are successively applied.

This method suffers from the disadvantage that the spacers, which are already clamped by the weight of the top, are clamped even more firmly due to the effect of tack weldings which shrink on cooling so that it is difficult to remove the said spacers. It is also possible for stress cracks to form in the tack welds when they cool and these cracks then remain as irregularities in the subsequent finish-welding operation.

It is the object of the invention to avoid these disadvantages by dispensing altogether with tack welding.

According to the invention this is achieved in that a plurality of corresponding claws is applied to both parts, the top part being located with respect to the bottom part in a position in which the claws are positioned opposite to each other and by the provision between the claws of each claw pairs of a resilient element which deforms when the weld shrinks.

The element may be such that it deforms plastically or elastically when the weld material shrinks. The element preferably consists of soft aluminum sheet. In general the material chosen for the resilient element is more ductile than that of the claws and has a thickness which is such that after the claws of the top part are placed upon the claws of the bottom part the gap which remains for filling with weld material will have the required height and the support surfaces of the claws have dimensions which are such that the element is deformed due to shrinkage of the weld seams without excessive stresses occurring therein.

The element may also comprise a spring for example, a Belleville or disc spring.

One embodiment of the subject of the invention is explained in the accompanying drawing.

The drawing is a vertical section through part of a heavy steel ring 1 which is to be welded to a cup 2. The steel ring is provided with a weld edge 1a and the cup is provided with a weld edge 2a. A plurality of claws 5 with upwardly orientated members 6 are welded on to the external circumference of the steel ring 1. An identical number of claws 10, whose members 11 are downwardly orientated, are welded on to the external circumference of the cup 2 in a position which corresponds to that of the claws 5. The end faces 12 and 13 of the members 6 or 11 respectively are disposed in the same plane as the end face 15 of the steel ring 1 or the end face 16 of the cup 2 respectively. After placing the steel ring 1 vertically the cup 2 is lowered thereon, a resilient element in the form of a spacer 20 of soft aluminium plate or in the form of a disc spring being placed between the corresponding claws 5, 10 of each claw pair. A gap 22 then remains between the cup and the steel ring. To lower the cup 2 it is suspended from ropes 21 which are guided under the top claws 10.

At least one first circumferential welding seam 23 may then be applied to the welding edges 1a and 2a of the steel ring 1 or of the cup 2 respectively. When the welding seam 23 cools a tensile stress will develop therein so that the spacers 20 will be subjected to pressure which is so high as to cause plastic deformation of the spacers which thus become thinner. The cup therefore approaches more towards the steel ring, thus preventing the tensile stresses in the welding seam 23 becoming excessive and thus preventing the formation of cracks. The claws can be removed for finish welding the welding edges 1a and 2a.

The material of the spacers 20 should be more ductile than that of the claws and the thickness of the said spacers should be such that the gap 22 has the required height for finish welding after the claws of the cup are placed on those of the steel ring. To this end the dimensions of the support surfaces of the aluminium plate on the claws can be made sufficiently large so that deformation of the aluminium plates due to shrinkage of the welding seams 23 proceeds at a rate in which no excessive stresses occur in the said welding seams.

The resilient element may also comprise an element of a different shape, for example a diaphragm spring. The distance between the end faces 12 and 13 of the members 6 or 11 respectively must be adapted to the height of the diaphragm spring. The diaphragm springs are preferably assembled on pins which are mounted on the lower claws 5.

It is advantageous to arrange for the distance $s$ between the inside of the claws and external circumference of the cup or steel ring respectively to be equal to at least half the claw thickness (measured perpendicularly to the drawing). This prevents the claws causing any severe, sudden cooling of the welding seams.

I claim:

1. Method for welding a top part and an associated bottom part, spacers being employed to form a gap between both parts for filling with weld material whereupon the gap is filled with weld material, characterized in that both parts are provided with a plurality of corresponding claws, that the top part is located relative to the bottom part in a position which is such that the claws are oppositely disposed and that a resilient element which deforms when the weld material shrinks is provided between the claws of each claw pair, said resilient element comprising a spacer of a material which is more ductile than that of the claws and has a thickness which is such that the gap for filling with weld material has the required height after the claws of the top part are placed upon the claws of the bottom part and the dimensions of the claw support surfaces are such that the spacer is deformed when the weld seams shrink but without any excessive stresses occurring in the said weld seam.

2. Method for welding a top part and an associated bottom part, spacers being employed to form a gap between both parts for filling with weld material whereupon the gap is filled with weld material, characterized in that both parts are provided with a plurality of corresponding claws, that the top part is located relative to the bottom part in a position which is such that the claws are oppositely disposed and that a resilient element which deforms when the weld material shrinks is provided between the claws of each claw pair, said element being a soft aluminum plate.

3. Method for welding a top part and an associated bottom part, spacers being employed to form a gap between both parts for filling with weld material whereupon the gap is filled with weld material, characterized in that both parts are provided with a plurality of corresponding claws, that the top part is located relative to the bottom part in a position which is such that the claws are oppositely disposed and that a resilient spring element which deforms when the weld material shrinks is provided between the claws of each claw pair.

4. Method for welding a top part and an associated bottom part, spacers being employed to form a gap between both parts for filling with weld material whereupon the gap is filled with weld material, characterized in that both parts are provided with a plurality of corresponding claws, that the top part is located relative to the bottom part in a position which is such that the claws are oppositely disposed and the distance between the inside of the claws and the external circumference of the associated top and bottom part are equal to at least half the claw thickness and that a resilient element which deforms when the weld material shrinks is provided between the claws of each claw pair.

* * * * *